(12) United States Patent
Chattopadhyay et al.

(10) Patent No.: US 9,740,940 B2
(45) Date of Patent: Aug. 22, 2017

(54) EVENT TRIGGERED LOCATION BASED PARTICIPATORY SURVEILLANCE

(71) Applicant: TATA CONSULTANCY SERVICES LIMITED, Maharashtra (IN)

(72) Inventors: Dhiman Chattopadhyay, West Bengal (IN); Arpan Pal, West Bengal (IN); Rohan Banerjee, West Bengal (IN); Ranjan Dasgupta, West Bengal (IN); Priyanka Sinha, West Bengal (IN); Aniruddha Sinha, West Bengal (IN); Chirabrata Bhaumik, West Bengal (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 303 days.

(21) Appl. No.: 14/386,518

(22) PCT Filed: Mar. 12, 2013

(86) PCT No.: PCT/IN2013/000147
§ 371 (c)(1),
(2) Date: Sep. 19, 2014

(87) PCT Pub. No.: WO2014/057496
PCT Pub. Date: Apr. 17, 2014

(65) Prior Publication Data
US 2015/0070506 A1 Mar. 12, 2015

(30) Foreign Application Priority Data
Mar. 26, 2012 (IN) .......................... 810/MUM/2012

(51) Int. Cl.
*H04N 7/18* (2006.01)
*G06K 9/00* (2006.01)
(Continued)

(52) U.S. Cl.
CPC ..... *G06K 9/00771* (2013.01); *G06K 9/00718* (2013.01); *G06K 9/00979* (2013.01);
(Continued)

(58) Field of Classification Search
CPC .......................... H04N 7/181; G08B 13/19645
See application file for complete search history.

(56) References Cited

U.S. PATENT DOCUMENTS

2008/0309761 A1 12/2008 Kienzle et al.
2009/0006286 A1 1/2009 Angell et al.
(Continued)

FOREIGN PATENT DOCUMENTS

WO 2006046234 A1 5/2006
WO 2011064530 A1 6/2011

OTHER PUBLICATIONS

International Search Report for International Application No. PCT/IN2013/000147, dated Sep. 10, 2014, 3 pages.

*Primary Examiner* — Chikaodili E Anyikire
(74) *Attorney, Agent, or Firm* — Ditthavong & Steiner, P.C.

(57) ABSTRACT

The present invention provides the multimodality filtration surveillance comprising of a plurality of filtration stages executed at the backend server to confirm nature of anomaly in an event, the filtration stages comprising: a first filter of a video anomalies detection in the event for a specified time-place value, a second filter of a city soundscape adapted to provide a localized decibel maps of a city, a third filter of a geocoded social network adapted to semantically read and analyze data from one or more social media corresponding to the specified time-place value, and a fourth filter of an event triggered or proactive local participatory surveillance adapted to provide augmented information on the detected anomalies.

16 Claims, 8 Drawing Sheets

(51) Int. Cl.
　　　*G08B 13/196*　　　(2006.01)
　　　*G08B 25/08*　　　(2006.01)
　　　*G08B 27/00*　　　(2006.01)

(52) U.S. Cl.
　　　CPC ....... *G08B 13/19613* (2013.01); *G08B 25/08* (2013.01); *H04N 7/181* (2013.01); *G06K 2009/00738* (2013.01); *G06K 2209/27* (2013.01); *G08B 27/006* (2013.01)

(56) References Cited

U.S. PATENT DOCUMENTS

| | | | |
|---|---|---|---|
| 2009/0010493 A1 | 1/2009 | Gornick et al. | |
| 2009/0216747 A1 | 8/2009 | Li et al. | |
| 2009/0216860 A1* | 8/2009 | Li | G06F 19/3493 709/219 |
| 2009/0219411 A1* | 9/2009 | Marman | H04N 5/772 348/231.99 |
| 2011/0013087 A1* | 1/2011 | House | A63B 24/0021 348/564 |
| 2011/0157360 A1 | 6/2011 | Lee et al. | |

* cited by examiner

EVENT TRIGGERED LOCATION BASED PARTICIPATORY SURVEILLANCE

CROSS REFERENCE TO RELATED APPLICATIONS

This application is a U.S. National Phase Application of International Application No. PCT/IN2013/000147, filed Mar. 12, 2013, which claims priority to Indian application No. 810/MUM/2012, filed Mar. 26, 2012, the content of both of which are incorporated herein by reference in their entireties.

FIELD OF THE INVENTION

The present invention relates to a system and method for surveillance of distributed geographical sites. More particularly, the present invention relates to comprehensive threat detection in surveillance system aided with participatory surveillance, city soundscape and social network post.

BACKGROUND OF THE INVENTION

Surveillance systems work as a scout for the geographical sites and assist governments and defense organization to maintain social control, recognize and monitor threats and further crucial in crime investigation. The surveillance systems are generally installed in sensitive areas such as market place, defense organization, educational and research institutes.

Typically, a surveillance system comprises a surveillance camera for capturing images of particular area under observation. Such surveillance systems capture continuous footage of the targeted locality. Such captured footage, for threat detection, requires continuous human analysis. Such analysis is tedious and typically involves cutting and stitching of the images according to sequence of events. Though, few tools such as VIRAT and HumanID are instrumental in chronological arrangement of events in the footage, mere chronological arrangement may not guarantee threat detection.

Moreover, traditional surveillance systems are configured to monitor predetermined targeted geographical sites. Considering, an event of interest for investigation or an action (policing, risk mitigation, defense operation, etc.) may occur at any arbitrary site, such surveillance of the predetermined targeted geographical sites more often results into unavailability of crucial information. Furthermore, an instantaneous nature of the action (policing, risk mitigation, defense operation, etc.), in certain events, would further require an intuitive correspondence of the event occurrence, threat identification, and action.

Hitherto, the surveillance systems are configured to detect threats based on limited event related information. Due to inappropriate processing of event related aspects, the present surveillance systems are believed to have poor probability of threat detection resulting in frequent false alarms which in turn putting unnecessary operational pressure on an action arm in the process. The system and method for reducing such frequent false alarms in the surveillance systems is still unaddressed in the art of the invention.

Though various surveillance systems are known to detect threat related to an event, however, emerging tools of information and intelligence gathering, e.g. social media posts, mobile captured and communication data that can be instantaneously utilized to build a rich context of the event for taking any decisive action are largely ignored in the art of the invention. Therefore, surveillance system known hitherto are primarily based on gathering intelligence through private network of professionals and installed surveillance tools. In spite of current equipment of citizens of personal sensory communication devices e.g. mobile phone, their participation in the surveillance activities is largely ignored. Hence, a system is required to facilitate either a voluntary or through a relevance based picking of citizens involvement in such participative surveillance.

In some of the prior art references certain aspects related to use of such information and intelligence gathering tools is disclosed, however, identification and integration of relevant participatory tools in a specific geography to augment healthy predictivity of threats associated with the events is still not precisely addressed. Accordingly, in a US20100245583 by Harel et al teaches mobile surveillance node adapted for capturing events of surrounding environment for threat detection, but, it doesn't discloses use of citizen participation in surveillance by participatory sensing mechanism.

In a Taiwanese patent application 200818916, Zhang Zhong et al teaches an user defined event based surveillance system that performs a wide area site based surveillance, but, it did not addressees integration of data received from a plurality of sources such as city soundscape, participatory videos and social network. Moreover, a concept of social network formation among sensory surveillance devices including cameras, audio recorders and other sensors are not disclosed.

Ashwin S et al. in "A J2ME-Based Wireless Automated Video Surveillance System Using Motion Detection Method" discloses a motion analysis based surveillance technique using a mobile phone. However, this scheme does not propose any participatory sensing mechanism as this is a standalone system where analytics happens at the phone.

Mohan M. Trivedi et al. in "Distributed Interactive Video Arrays for Event Capture and Enhanced Situational Awareness" discloses an architecture for event based recognition. However, this paper does not discloses about event based subscription using a messaging middleware and sharing of citizen's video in participatory mode.

Another drawback with conventional surveillance systems is that it does not consider audio analytics based city soundscape nor does it infers from social networking data as an extended and indirect tool for citizen participation in surveillance by participatory sensing mechanism.

Thus there exists a need to address the long standing problem of providing a method and system enabling comprehensive augmentation of conventional surveillance system for greater geographical data acquisition, participative surveillance and intuitive and automated alerting of threats.

These drawbacks can be overcome with the attendant features and advantages of the present invention.

OBJECTS OF THE INVENTION

The principal object of the present invention is to provide a system and method for reducing the false alarms in an event driven video surveillance using participatory sensing in audio/video and geo-located social network analysis.

Another object of the present invention is to provide a system and method for augmentation of city soundscape, city surveillance data and geo location tagged social network messages with conventional surveillance information for comprehensive analytics.

Yet another object of the present invention is to provide a system and method of coupled surveillance cameras forming a social network among them based on one or more common intents.

Yet another object of the present invention is to provide a system and method for providing mechanism to augment using geo-tagged social network data and using city audio-map created from cell phones throughout the city.

SUMMARY OF THE INVENTION

The present invention is directed to system and methods of operation that are further described in the following Brief Description of the Drawings, the Detailed Description of the Invention, and the claims. Other features and advantages of the present invention will become apparent from the following detailed description of the invention made with reference to the accompanying drawings.

The principal aspect of the invention is to provide a system for surveillance of distributed geographical sites. Any investigation (e.g., criminal, financial) and state action (e.g., policing, risk mitigation, defense operation, etc.) of an act, omission or incidence generally revolves around intelligence gathering associated with plurality of events associated with such act, omission or incidence. Accordingly, each event in the present application is associated with at least one predefined characteristics act, omission or incidence that is accessible to a plurality of event subscribers.

The said system comprises a plurality of sensing device flexibly coupled to a plurality of geographically distributed site; a sensory information processing unit electrically coupled with the each sensing device and a combination thereof, the sensory information processing unit comprising: a video analytics module configured to identify and index the events in the captured sensory information and generate a cumulative metadata therefor; a backend analytics server, coupled with a messaging middleware, a central storage and a plurality of participatory surveillance tool, is configured to perform a multimodality filtration surveillance for anomaly detection in the events; and a search module adapted for a real threat detection comprising a temporal search for identification of a distinct spacio-temporal character the each event and a geo-spatial search providing a color graded heat-map illustrating geographical distribution of city sound.

Yet another aspect of the invention is to provide multimodality filtration surveillance comprising of a plurality of filtration stages executed at the backend server to confirm nature of anomaly in an event, the filtration stages comprising: a first filter of a video anomalies detection in the event for a specified time-place value, a second filter of a city soundscape adapted to provide a localized decibel maps of a city, a third filter of a geocoded social network adapted to semantically read and analyze data from one or more social media corresponding to the specified time-place value, and a fourth filter of an event triggered local participatory surveillance adapted to provide augmented information on the detected anomalies.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION OF THE INVENTION

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary of the invention, which may be embodied in various forms. The words "individual" and "person" are synonymous and interchangeable.

The present invention provides a system for surveillance of distributed geographical sites for a plurality of event, each event associated with at least one predefined characteristics and accessible to a plurality of event subscribers, the said system comprises: a plurality of sensing device flexibly coupled to a plurality of geographically distributed site; a sensory information processing unit electrically coupled with the each sensing device and a combination thereof, the sensory information processing unit comprising: a video analytics module configured to identify and index the events in the captured sensory information and generate a cumulative metadata therefor; a backend analytics server, coupled with a messaging middleware, a central storage and a plurality of participatory surveillance tool, is configured to perform a multimodality filtration surveillance for anomaly detection in the events; and a search module adapted for a real threat detection comprising a temporal search for identification of a distinct spacio-temporal character the each event and a geo-spatial search providing a color graded heat-map illustrating geographical distribution of potential security events along with timestamp.

The present invention provides a method for surveillance of distributed geographical sites for a plurality of event, each event associated with at least one predefined characteristics and accessible to a plurality of event subscribers, the said method comprises: coupling flexibly a plurality of sensing devices to a plurality of geographically distributed sites to capture a sensory information from the each site; processing the captured sensory information to index the each event and generate a cumulative metadata therefor; compressing and storing the captured sensory information, indexed events and the corresponding metadata thereof in a local storage;

storing the sensory information and metadata of the each indexed event from the plurality of local storages into a central storage; performing a multimodality filtration surveillance for anomaly detection in the events; and searching spacio-temporal and geo-spatial characters of the events identifying a distinct temporal occurrence of events and a geographically distributed color graded heat-map of the city sounds.

Figure 1:
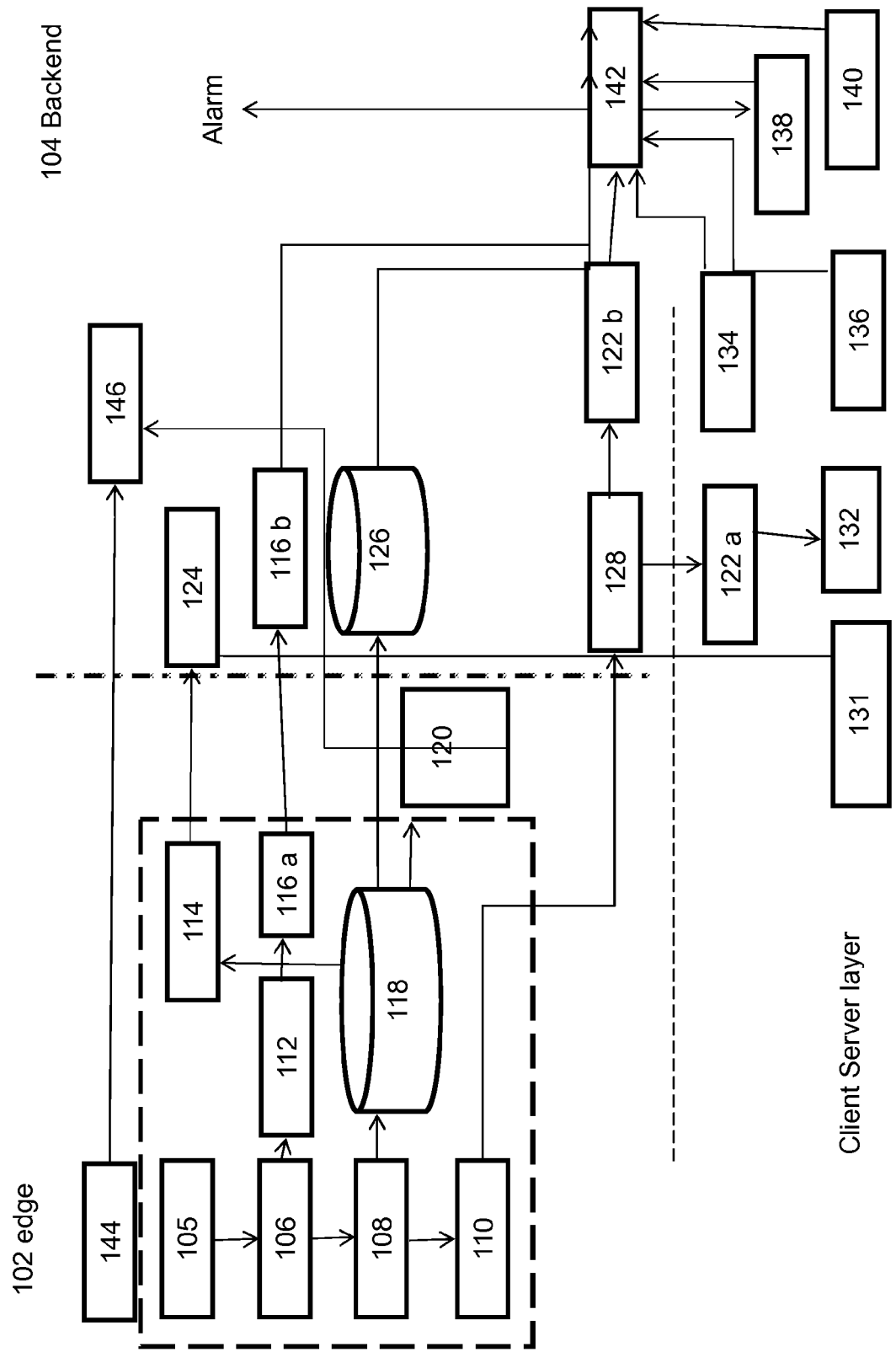
FIG. 1 is a schematic block illustration of event driven surveillance system.

FIG. 1 illustrates an event driven video surveillance system 100, which can be used for augmentation of conventional surveillance data with participatory sensing, city audio map and social media information to generate detailed analytical report.

Referring to FIG. 1, an event driven video surveillance system 100 is provided for surveillance of distributed geographical sites, each site under surveillance is configured for indexing of a plurality of audio-visual event and a subsequent subscription of the each event by a plurality of event subscriber. The system 100 comprises of an edge module 102 and a backend module 104.

The edge module 102 further comprises a sensing device 105, an analytical module 106, an indexing module 108, an event publisher module 110, a video compression module 112, an edge web server 114, an edge storage 116a and an edge meta database 118.

The backend module 104 further comprises an event subscriber 122b, a central web server 124, an archive database 116b, a central meta database 126, a message bus 128 and a backend analytics server 142.

The system 100 further comprises a client viewer layer comprising of an event subscriber 122a, a dashboard (not shown in the figure), a proactive surveillance module 134 for proactive surveillance, a participatory surveillance module 138 for participatory surveillance, a social network 140, an event rendering module 131, an event list module 132 and a city soundscape 136, each module functionally operating to provide a user access to multimodality sensory information access from the plurality of relevant sources.

In another embodiment of the invention the events are detected from a pre-identified spectral map of gunshot, traffic noise, crowd noise, explosion noise, human emotions including screaming, crying and shouting thereby augmenting an audio surveillance of the city.

In another embodiment of the invention the each geographical site under surveillance is pre coded and the information emanating therefrom is semantically analyzed.

In another embodiment of the invention for an arbitrary instance, each sensing device 105 is configured to continuously capture audio-visuals of at least one site and transmit the captured sensory input over a local network to a gateway device.

In another embodiment of the invention the sensing devices 105 comprise of a surveillance camera, an audio capturing device, and a mobile digital device. The sensing device 105, at one instance, is flexibly located at least one pre identified geographically distributed site.

In another embodiment of the invention the sensory inputs of one or more surveillance cameras are coupled with at least one social networking application, the said sensory input comprising a spatiotemporal data having attributes and is adapted to maintain an implicit coherence in semantics to preserve an ambient context with other sensory inputs, the coupled surveillance cameras forming a social network among themselves based on one or more common intents.

In another embodiment of the invention the edge modules 102 captures video streams from the sensing device 105. In an exemplary embodiment of the invention the sensing device 105 is an IP camera. The edge module 102 configured to runs video analytics algorithm. The edge module 102 configured to stores the video in a compressed format using any prevailing video codec format preferably compatible with html5 standard. The edge module 102 configured to capture a snapshot of scene every second. The video and snapshot is saved in the edge storage 116. The archive database 116b is configured to capture historical records of video and snapshots and connected to the edge storage 116.

In another embodiment of the invention the edge modules 102 further comprises sensory information processing unit (not shown in figure). The sensory information processing unit is operably coupled with a local storage hosted on a local web server, the local storage is adapted to compress and store the captured audio-visuals, indexed events and the corresponding metadata thereof.

In another embodiment of the invention the processing of the captured sensory information further comprises of splitting continuous video streams into a plurality of particular video clips, each clip corresponding to one particular event selected by the event subscriber enabling a fast retrieval of the selected individual event.

In another embodiment of the invention a new event is published on a messaging middleware in an asynchronous manner by using the event publisher 110. The event is consumed by subscriber client by using the event subscriber 122 configured to subscribe for different types of events on the message bus 128. The viewer will get all the subscribed events in their dashboard and individual events can be selected by clicking the hyperlink of the events. The viewer clicks any of the events, the details will be retrieved from the meta database 118 and corresponding event is rendered on the screen of viewer's device. Thus the event dashboard is generated at client side which has subscribed for the event.

In another embodiment of the invention the edge analytics module 106 is configured for video analytics algorithm. The edge analytics module 106 generates the cumulative metadata in xml format. The cumulative metadata comprises of event id, event type, video url, UTC timestamp of event occurrence, start time of the event, frame number, duration, location of the event, camera id, count of suspicious objects, object list and severity. The information related to the new event gets inserted in metadata xml file. The data is stored in the meta database 118 hosted in the edge web server 114.

In another embodiment of the invention the video edge analytics module 106 running at the edge device detects events from video and generates the edge analytics metadata associated with the event. The event clips are stored on the edge storage 116a and associated metadata is stored in the edge database 118. Then the events are reported to the backend module 104. The recorded video can be retrieved from the archive database 116b and can be played back for full duration or for the event period based on the metadata information.

In another embodiment of the invention the backend analytics server 142 further comprises analytics module for running the data mining and business intelligence tools to extract more comprehensive data about the incidents and possible threats. The events are pushed into the backend analytics server 142 from multiple sites generating huge data mining.

In another embodiment of the invention a messaging middleware is configured to receive a plurality of event subscription request from the event subscribers 122.

In another embodiment of the invention the event publishing tool is coupled with the local storage and is configured to asynchronously transmit recorded information of each event to the messaging middleware.

In another embodiment of the invention the mobile users may have recorded some videos which give clues to the intelligence agencies for post mortem analysis. The users will be able to upload the compressed video directly into the storage server of the backend module 104.

In another embodiment of the invention the backend module 104 detects video anomalies for a region the backend application will use the listener platform application programming interface (API) available on the platform to read data from tweets, posts and blogs pertaining to the same region and time. Analytics like Natural language Processing (NLP) and mood analysis on this data shall provide augmented information on the anomalies detected and they shall be used to enhance the heat-map data. The city soundscape data may also be consumed by the backend analytics server 142 for more comprehensive analytics.

In another embodiment of the invention the backend analytics server 142 is configured to execute the spacio-temporal and geo-spatial characteristics search on the data mining and business intelligence tools to extract consolidated rich information about the each selected event identified through a multimodality filtration of a plurality of participatory surveillance tools, surveillance cameras, and audio recordings.

In another embodiment of the invention the backend analytics server 142 further comprises of a data reduction module configured to split a continuous video streams into a plurality of particular video clips, each clip corresponding to one particular event selected by the event subscriber enabling a fast retrieval of the selected individual event.

In another embodiment of the invention the data reduction module is configured for data reduction through event clipping and event stitching and indexing. The two stage data reduction is provided for data reduction module. Firstly we extract the information by detecting the event information from continuous video streams. In the next stage, the event clips are separated into individual clips and the clips are indexed and stitched together in such a way that any individual event can be retrieved very fast compared to timestamp based retrieval.

In another embodiment of the invention the system 100 further comprising an Image indexing module (not shown in figure) configured to stitch each detected particular event and form a chronological sequence video of the particular events.

In another embodiment of the invention, the backend module 104 configured to augment detected anomalies with social network data. The backend module 104 detects video anomalies for a region the backend application will use the listener platform application programming interface (API) available on the platform to read data from social network posts and blogs pertaining to the same region and time. Based on the location of possible threats the backend module 104 configured with the backend server 142 request for recorded videos from all the mobile users in the adjoining areas.

In another embodiment of the invention the system 100 further comprising a legacy system Network Video Terminal (NVT) 144, a legacy client Network Video Client (NVC) 146, a legacy storage backend module 148 and a legacy system adapter 150 adapted for the holistic view of a comprehensive surveillance solution.

In another embodiment of the invention the central storage 126 is hosted in the backend module 104 and is configured to store the sensory information and a consolidated event indexes and corresponding metadata thereof from the plurality of local storages connected therewith.

In another embodiment of the invention the event rendering module 131, upon selection of the event, is configured to asynchronously publish the each selected event onto a user dashboard and intuitively suggest a plurality of threat prone events for user subscription.

In another embodiment of the invention the system 100 further comprises of a participatory surveillance tools comprise of: a proactive and an event triggered surveillance information input applications.

In another embodiment of the invention the participatory surveillance tools further comprise of: video and sound recordings received from mobile devices and text/voice call recordings from the plurality of local sites.

In another embodiment of the invention the backend module 104 configured to take input from participatory surveillance tools enabling augmenting the data of surveillance camera feeds, city soundscape, participatory surveillance and social network input.

In another embodiment of the invention the city soundscape is further configured to provide different color hues visually representing a localized decibel map of different classes of sound.

In another embodiment of the invention an impact of the each participatory surveillance tool is classified based on a natural language processing of the captured audio from the plurality of sites and is represented in a heat map on top of a Geographical Information System (GIS) map.

In another embodiment of the invention the multimodality filtration surveillance is provided comprising of a plurality of filtration stages executed at the backend analytics server 142 to confirm nature of anomaly in an event, the filtration stages comprising: a first filter of a video anomalies detection in the event for a specified time-place value, a second filter of a city soundscape adapted to provide a localized decibel maps of a city, a third filter of a geocoded social network adapted to semantically read and analyze data from one or more social media corresponding to the specified time-place value, and a fourth filter of an event triggered local participatory surveillance adapted to provide augmented information on the detected anomalies.

Figure 2:
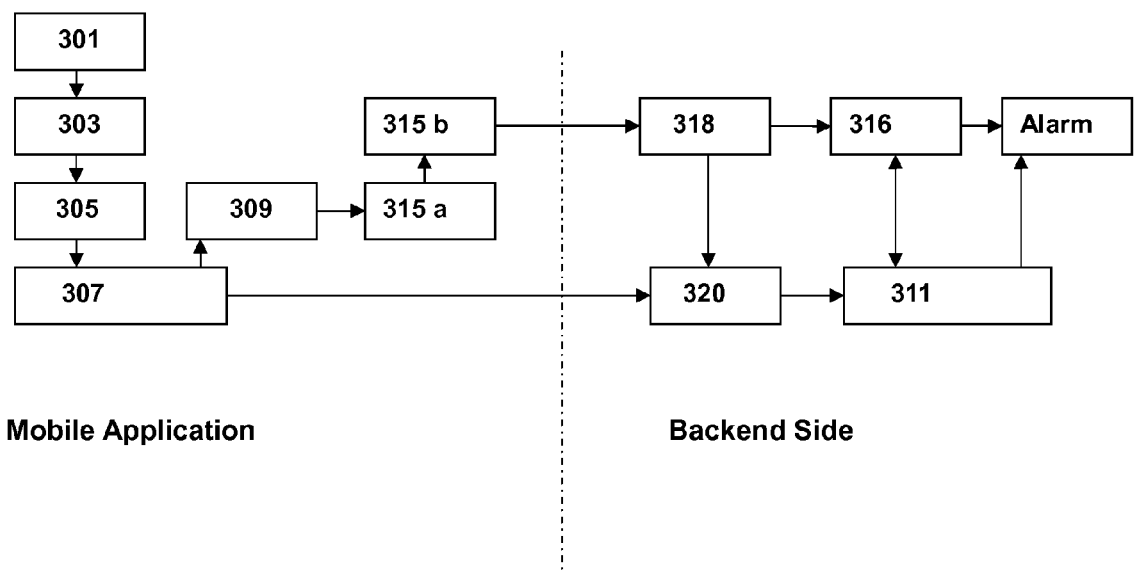
FIG. 2 is a block diagram of proactive participatory surveillance according to one exemplary embodiment of the invention.

FIG. 2 is a block diagram of proactive participatory surveillance according to one exemplary embodiment of the invention.

Referring to FIG. 2, the system 100 with aided participatory sensing is illustrated. A citizen launch application 301 is installed in the cell phones and sensory mobile devices. The user has to sign in their account. The authentication of the account will be verified by an authentic module 303. The audio-visuals are captured via a capturing means 305 such as camera in built in mobile phone. The aided participatory is communicably connected with the backend module 104.

In another embodiment of the invention a primary analytics module 307 is provided for primary analytics and generating event metadata. An indexing module 309 is provided for the event clip separation, stitching and indexing. After generating video with metadata it is encoded via an encoding module 315*a* and an uploaded via an uploading module 315*b* in the local storage after which stored in the central storage. A secondary analytics module 311 is provided for analyzing the event and provides the prediction for event and further generates the alarm to notify police/emergency services. The FIG. 2 further illustrates a database 316 for storing a metadata and a decoded module 318 adapted for decoding video for analytics of events.

In another embodiment of the invention the Individual events will be clipped out to separate video chunks and then individual event chunks are aggregated with indexing to form a reduced video file consisting of only events. There will be one to one mapping between time stamped events and indexed location in the new video file.

In another embodiment of the invention the chunk size will be configurable such that the administrator decides on how much pre and post information is required for the events.

In another embodiment of the invention the proactive participatory surveillance provides the citizen to take part in surveillance proactively without any triggering from server. The invention allows only authorized users to participate as auxiliary surveillance node. In this case user captures a video and a primary analytics runs on his mobile device to detect events. The video clip is separated into multiple event clips; the chunk size will be configurable. Then the events clips are stitched together with indexing. Then the stitched event video is encoded using a low complexity encoder and the encoded video clip with event metadata is uploaded to the backend storage.

Figure 3:
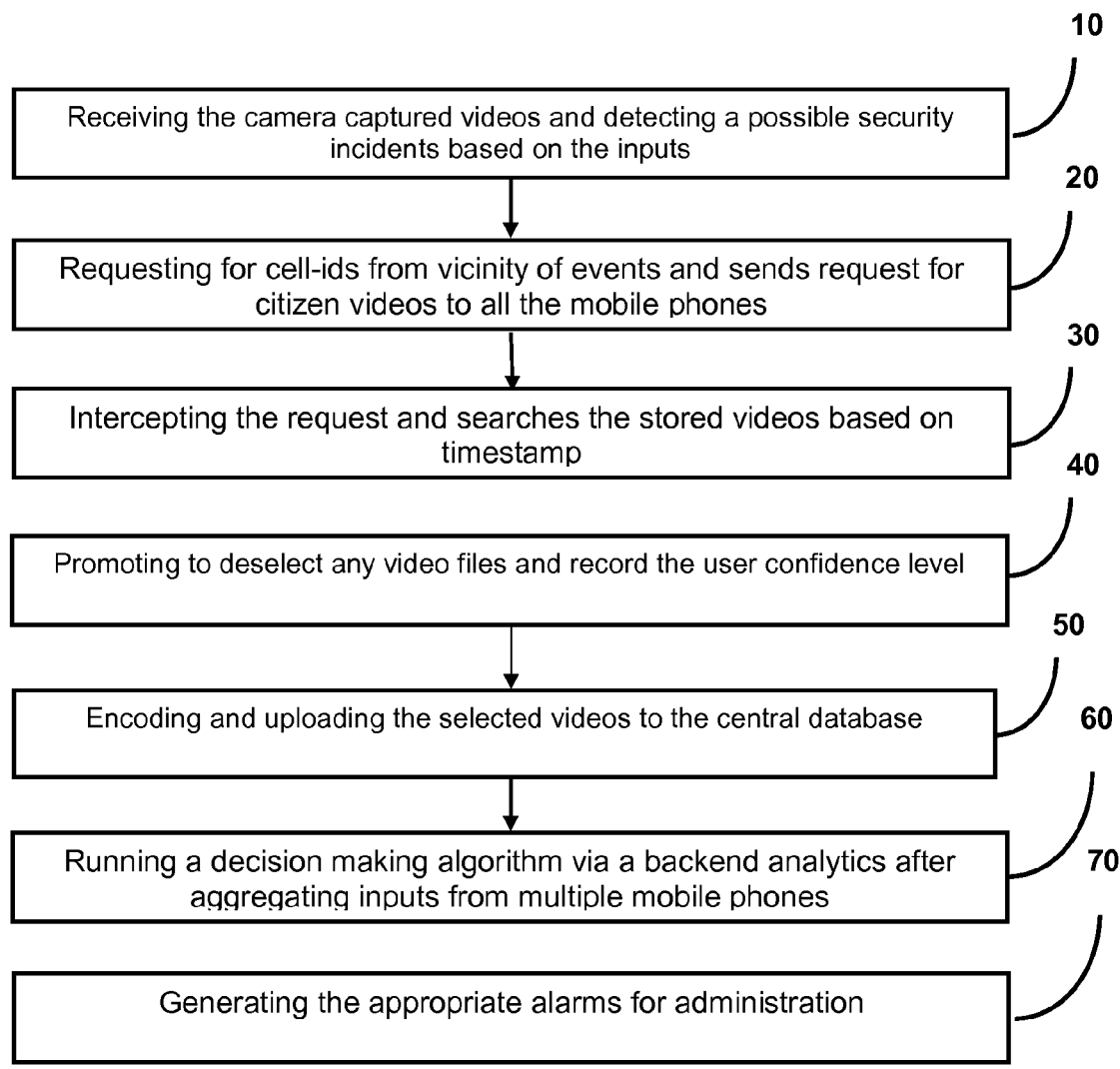
FIG. 3 is a flow chart illustrating of event triggered location based participatory surveillance by using citizen launch application.

FIG. 3 is a flow diagram illustrating of event triggered location based participatory surveillance by using a citizen launch application.

Referring to FIG. 3, the method for surveillance of distributed geographical sites, each site under surveillance is configured for indexing of a plurality of audio-visual event and a subsequent subscription of the each event by a plurality of event subscriber.

In the initial step 10 of the proposed method, the edge module is configured for receiving a camera captured videos and event metadata, the backend server runs analytics to predict or detect a possible security incidents based on the inputs. In the next step 20, requesting for cell-ids from vicinity of events and sends request for citizen videos to all the mobile phones based on the type of event backend analytics. After sending the request, in the next step 30, the mobile application running at citizens mobile intercepts the request and searches the stored videos based on timestamp. In the next step 40, the user is prompted to deselect any video files and record his confidence level. In the next step 50, all the selected video files are encoded and uploaded to the central database. In the next step 60, the backend analytics runs a decision making algorithm after aggregating inputs from multiple mobile phones. In the final step 70 of the proposed method, generates the appropriate alarms for administration.

In another embodiment of the invention, the application provides provision for authorized mobile users to proactively act as an auxiliary "surveillance node" without any triggering from the backend module 104. In this case mobile user may encounter an incident which user records in his mobile and wishes to share with the administration. In this case two stage analytics will be performed. The primary analytics will run on the mobile of the user generating events metadata. The mobile application will publish the event to the centralized message bus through defined interfaces. The mobile application will encode the captured video clip using a low complexity proprietary encoder and then upload the encoded clip to the backend storage. The backend module 104 will decode the video, and runs the secondary analytics based on the event metadata shared by the participatory user.

In another embodiment of the invention the surveillance cameras and equipments in a common vicinity or compound can connect with each-other socially based on a common intent to share data among themselves. In this case every member of the neighborhood gets the complete picture, results in more chances of the premises being secure. For example, surveillance cameras can be built in with the utility to communicate with each other depending on owners' social distance threshold. City surveillance cameras may connect to any neighborhood camera. Once cameras connect to each other, the analytical algorithms on images can now run in a distributed mode taking a final decision based on multiple cameras, such as, an abnormal activity detected on one camera at time t1, if detected again at another camera at time t2 has higher chance of being a positive result than a false positive.

In another embodiment of the invention the scope for searching data among enormous video data gets reduced by usage of intelligent social network of the cameras based on intent.

In another embodiment of the invention the mechanism enables third party application developers to develop application which can invoke web services for retrieving specific events from stored media. The event triggered participatory surveillance will be based on a trigger from the backend server. When the backend analytics detects any abnormal situation the subscribers from the vicinity of incidence will be invited to upload the recorded videos for further analysis.

In another embodiment of the invention, a vast number of mobile phones can be a medium to generate the city soundscape in a collaborative mode by citizens to provide augmented information on the anomalies detected and they shall be used to enhance the heat-map data.

In another embodiment of the invention the event triggered location based participatory video surveillance is provided with a separate module for participatory sensing by citizen through sharing of mobile phone captured audio visual clips. Here, as the mobile video clip needs to be transmitted to the server over wireless channel the video needs to be encoded.

Figure 4:
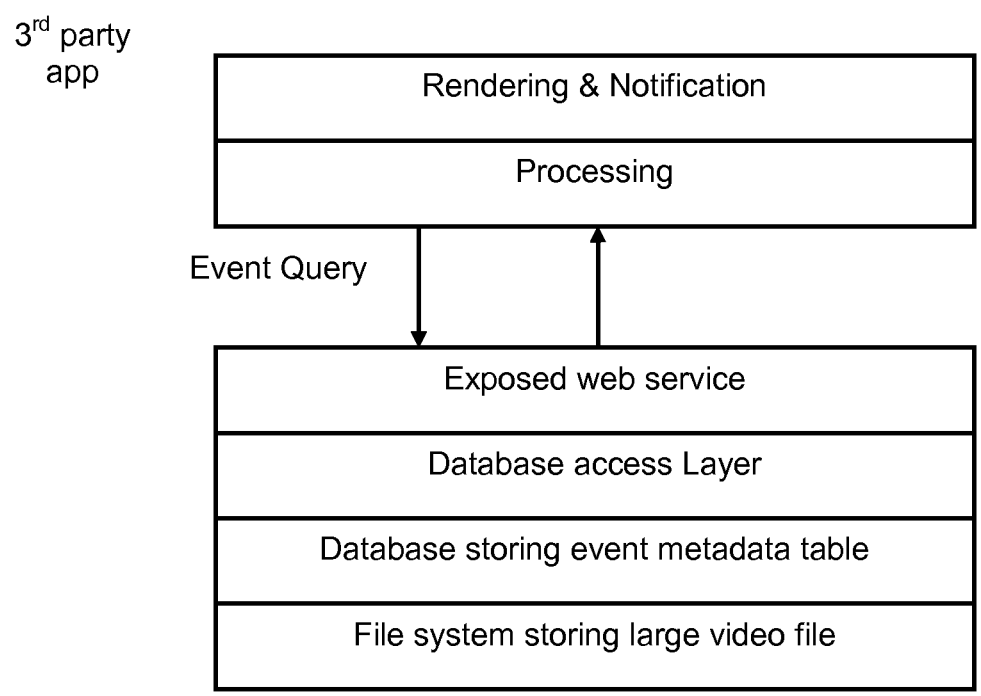
FIG. 4 illustrates design for remote retrieval of events for third party application development according to one exemplary embodiment of the invention.

FIG. 4 illustrates design for remote retrieval of events for third party application development according to one exemplary embodiment of the invention.

Referring to FIG. 4, the system 100 provides the third party application developer that pass on the SQL query to the web service invoking the database access layer, access the metadata information and then returns the query result in XML or JSON format. The results can be further processed as per the application need. For an example one use case of this scheme may be a car insurance premium calculation application development by an insurance company, the premium varies based on the driving pattern and tickets. The application may consume lane breaking events stored by surveillance cameras to find the driving pattern and calculate the premium.

Figure 5A:
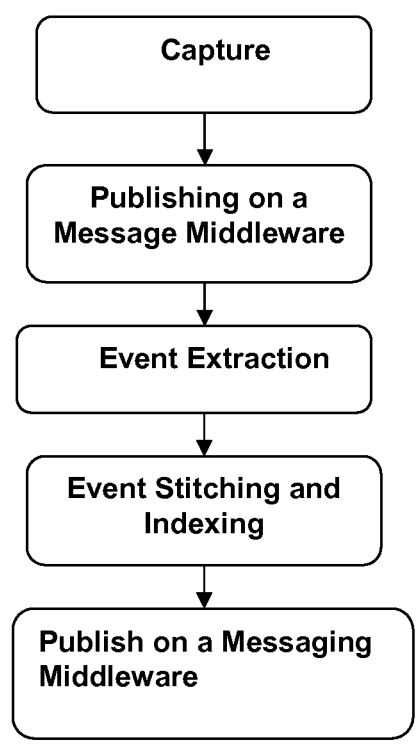
FIG. 5a illustrates activity diagram of surveillance event publishing according to one exemplary embodiment of the invention.

FIG. 5a illustrates activity diagram of surveillance event publishing according to one exemplary embodiment of the invention.

Figure 5B:
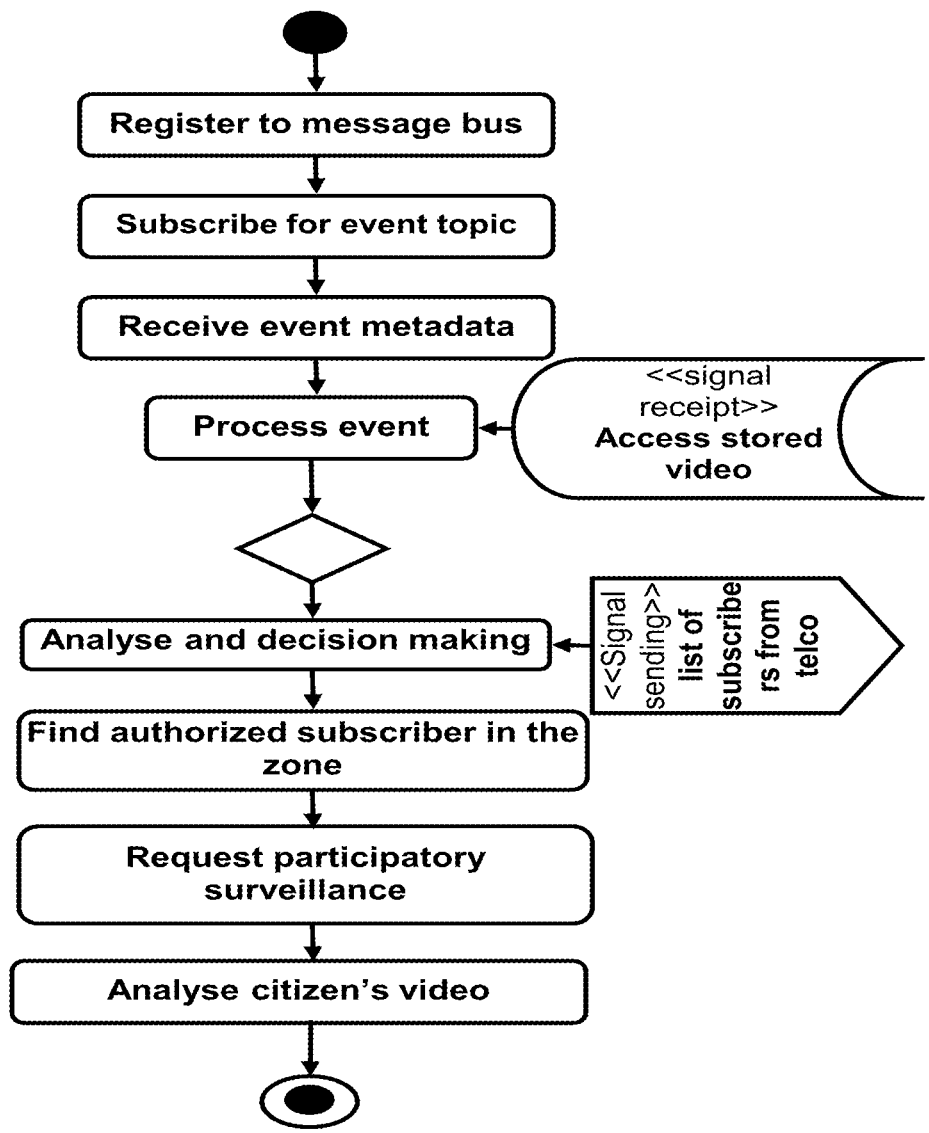
FIG. 5b illustrates activity diagram of surveillance event subscribing according to one exemplary embodiment of the invention.

FIG. 5b illustrates activity diagram of surveillance event subscribing according to one exemplary embodiment of the invention.

Figure 6:
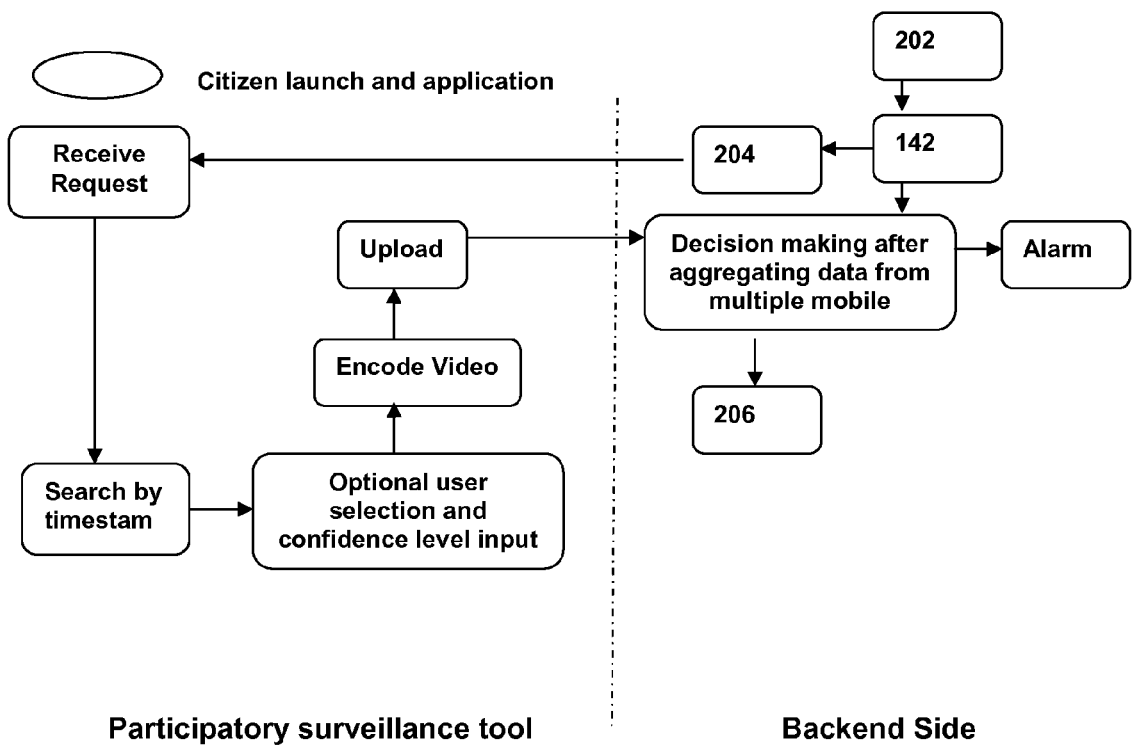
FIG. 6 illustrates block diagram of Event triggered location based participatory surveillance.

FIG. 6 illustrates block diagram of Event triggered location based participatory surveillance.

Referring to FIG. 6, the system 100 further comprising: an event metadata generation module 202 coupled with a plurality of sensory devices located at a distributed sites in a predefined geography; a plurality of participatory surveillance tool flexibly located at arbitrary sites, each participatory tool adapted to gather sensory data and communicate; a participating tool selector module 204 configured to select at least one participating tool on at least one relevance parameter; and a multimodality filtration surveillance module 206 installed at a backend analytics server 142, is configured for a plurality of modality based filtration of the gathered sensory information for anomaly detection in the events.

In another embodiment of the invention the event metadata generation module 202 coupled with a plurality of sensory devices located at a distributed sites in a predefined geography is configured for receiving the camera captured videos and event metadata.

In another embodiment of the invention the backend server 142 runs analytics to predict or detect a possible security incidents based on the inputs. A plurality of participatory surveillance tool (not shown in figure) flexibly located at arbitrary sites, each participatory tool adapted to gather sensory data and communicate, requesting for cell-ids from vicinity of events and sends request for citizen videos to all the surveillance participatory based on the type of event backend analytics.

In another embodiment of the invention the participating tool selector module 204 configured to select at least one participating tool on at least one relevance parameter. All the selected video files are encoded and uploaded to the central database 126.

In another embodiment of the invention the multimodality filtration surveillance module 206 installed at a backend analytics server 142 is configured for a plurality of modality based filtration of the gathered sensory information for anomaly detection in the events.

In another embodiment of the invention the multimodality filtration surveillance module 206 comprises of a plurality of filtration stages executed at the backend server 142 to confirm nature of anomaly in an event, the filtration surveillance module further comprising: a module for first filter of a video anomalies detection in the event for a specified time-place value, a module for second filter of a city soundscape adapted to provide a localized decibel maps of a city, a module for third filter of a geocoded social network adapted to semantically read and analyze data from one or more social media corresponding to the specified time-place value, and a module for fourth filter of an event triggered local participatory surveillance adapted to provide augmented information on the detected anomalies.

In another embodiment of the invention the video surveillance data will be augmented with participatory surveillance data, participatory audio data from cellphones creating a city soundscape and social network tweets for a specific locality and time which helps to generate more comprehensive analysis report.

Figure 7:
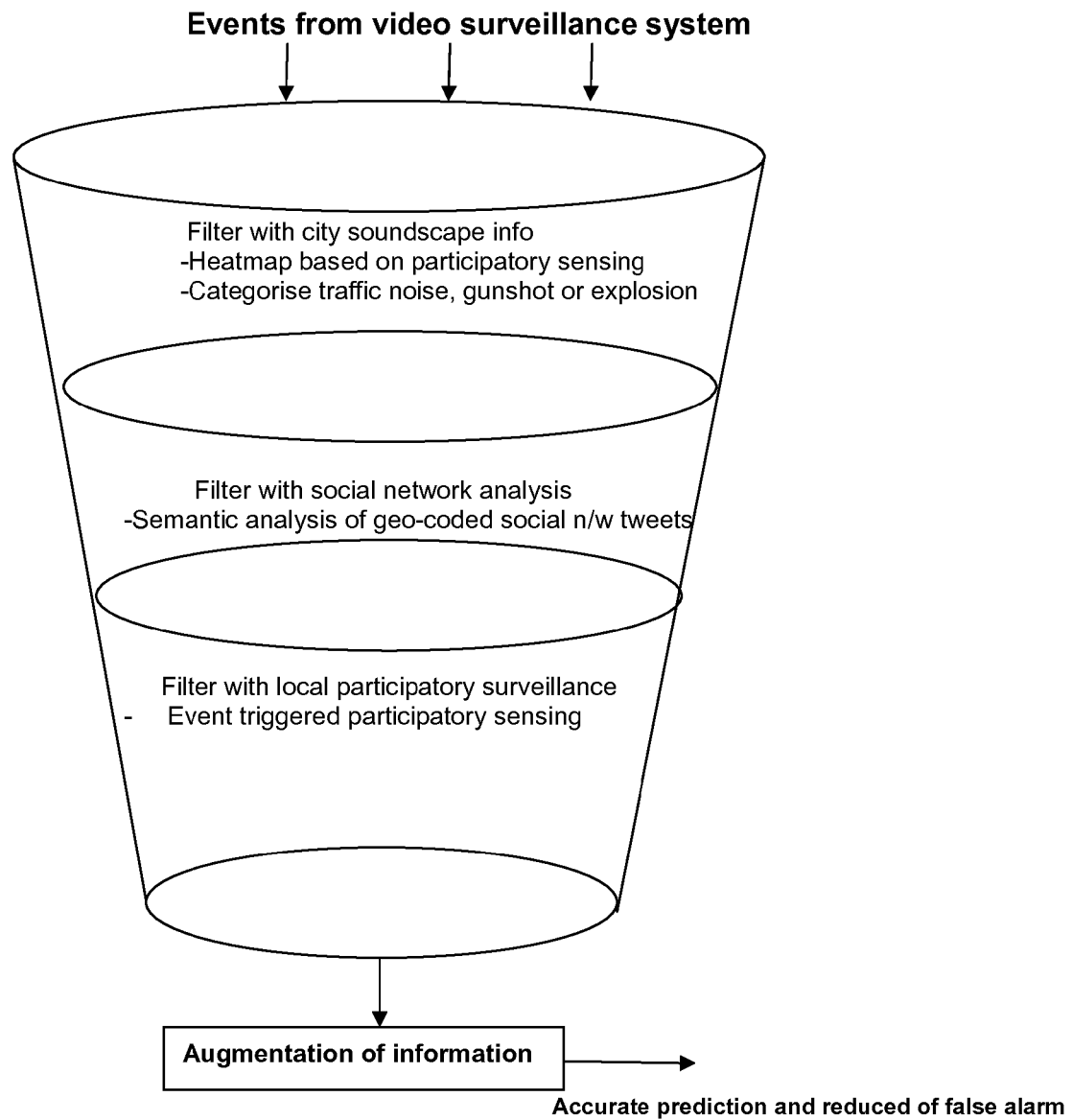
FIG. 7 illustrates filtering of events after augmentation with other data according to one exemplary embodiment of the invention.

FIG. 7 illustrates filtering of events after augmentation with other data according to one exemplary embodiment of the invention.

The FIG. 7 provides multimodal approach to provide threat detection thereby reducing false alarms by the augmentation of information from all available sources namely ambient information and citizen information. The flow of data will be as follows:
a) Events generated by traditional video surveillance system first filtered with city soundscape data to derive a better understanding of the events,
b) City soundscape provide localized decibel maps of a city with sounds classified in gunshot, traffic noise, crowd noise and explosion noise etc, includes the human emotions like screaming, crying and shouting, and
c) further filtering with geocoded social network update ('tweet') analysis to sense what is being reported by the citizens and then engage the citizen from the location of incidents to share their recorded videos filtered by local video participatory surveillance.

The preceding description has been presented with reference to various embodiments of the invention. Persons skilled in the art and technology to which this invention pertains will appreciate that alterations and changes in the described process and methods of operation can be practiced without meaningfully departing from the principle, spirit and scope of this invention.

ADVANTAGES OF THE INVENTION

The system and method of the proposed invention has the following advantages:
1. The present invention provides citizen to act as eyes and ears of the government where citizen will also upload their recorded video of the incident spots.
2. The present invention enables reducing the false alarm in an event driven video surveillance. The multimodal filtration approach extracts comprehensive information from all information sources apart from surveillance camera captured incidents
3. The present invention enables fast retrieval of video clips using geospatial query from the video surveillance system.

We claim:
1. A system for surveillance of distributed geographical sites for a plurality of event, each event associated with at least one predefined characteristics and accessible to a plurality of event subscribers, the system comprises:
a plurality of sensing device flexibly coupled to a plurality of geographically distributed site;
a sensory information processing unit electrically coupled with the each sensing device and a combination thereof, the sensory information processing unit comprising:
a video analytics module configured to identify and index the events in the captured sensory information and generate a cumulative metadata therefor;
a plurality of participatory surveillance tool comprising mobile data gathering and communication devices, each participatory tool being selectively identified based on the event metadata and configured to share gathered sensory information corresponding to the said event, wherein the plurality of participatory surveillance tool comprises a proactive and an event triggered surveillance information input applications installed thereon the sensory devices, social network posts referring to a geo-tagged social network data, video and sound recordings received from mobile devices and text/voice call recordings from the plurality of local sites;
a backend analytics server, coupled with a messaging middleware and a central storage, is configured to perform a multimodality filtration surveillance for anomaly detection in the events; and
a search module adapted for a real threat detection comprising a temporal search for identification of a distinct spacio-temporal character the each event and a geospatial search providing a color graded heat-map illustrating geographical distribution of potential security events along with timestamp.
2. The system of claim 1, wherein at an instance during surveillance period, each sensing device is configured to continuously capture audio-visuals of at least one site and transmit the captured sensory input over a local network to a gateway device.

3. The system of claim 1, wherein the sensory information processing unit is operably coupled with a local storage and a local web server, the local storage is adapted to compress and store the captured audio-visuals, indexed events and the corresponding metadata thereof, wherein the local storage is further coupled with an event publishing tool configured to asynchronously transmit each recorded event information to a messaging middleware, wherein the messaging middleware is further configured to receive a plurality of event subscription request from the event subscribers.

4. The system of claim 1, wherein a central storage exist along with a central web server and is configured to store the sensory information and a consolidated event indexes and corresponding metadata thereof from the plurality of local storages connected therewith.

5. The system of claim 1, wherein an event rendering module, upon selection of the event, is configured to asynchronously publish the each selected event onto a user dashboard and intuitively suggest and rank a plurality of threat prone events for user subscription.

6. The system according to claim 1, wherein the relevance parameters for selection of the participating tools comprise of relative proximity of the tool to a recorded geospatial location of the event and time of occurrence of the event.

7. The system according to claim 1, wherein the multimodality filtration surveillance module comprises of a plurality of filtration stages executed at the backend server to confirm nature of anomaly in an event, the multimodality filtration surveillance module further comprising: a module for first filter of a video anomalies detection in the event for a specified time-place value, a module for second filter of a city soundscape adapted to provide a localized decibel maps of a city visualized as different color hues indicating different classes of sound, a module for third filter of a geocoded social network adapted to semantically read and analyze data from one or more social media corresponding to the specified time-place value, and a module for fourth filter of an event triggered local participatory surveillance adapted to provide augmented information on the detected anomalies.

8. The system according claim 1, wherein the sensory inputs of one or more surveillance cameras are coupled with at least one social networking application, the said sensory input comprising a spatiotemporal data having attributes and is adapted to maintain an implicit coherence in semantics to preserve an ambient context with other sensory inputs, the coupled surveillance cameras forming a social network among themselves based on one or more common intents.

9. The system according to claim 1, wherein an impact of the each participatory surveillance tool is classified through audio analysis and natural language processing and is represented in a heat map on top of a Geographical Information System (GIS) map.

10. The system according to claim 1, wherein the each geographical site under surveillance is pre coded and the information emanating therefrom is semantically analyzed.

11. The system according to claim 1, wherein the backend analytics server is further configured to execute the spacio-temporal and geo-spatial characteristics search on the data mining and business intelligence tools to extract consolidated rich information about the each selected event identified through a multimodality filtration of a plurality of participatory surveillance tools, surveillance cameras, and audio recordings.

12. The system according to claim 1, wherein the backend analytics server is further comprise of a data reduction module configured to split a continuous video streams into a plurality of particular video clips, each clip corresponding to one particular event selected by the event subscriber enabling a fast retrieval of the selected individual event.

13. The system according to claim 1, further comprising an Image indexing module configured to stitch each detected particular event and form a chronological sequence video of the particular events.

14. A system for an event triggered participatory surveillance, the system comprising: an event metadata generation module coupled with a plurality of sensory devices located at a distributed sites in a predefined geography; a plurality of participatory surveillance tool flexibly located at arbitrary sites, each participatory tool adapted to gather sensory data and communicate; a participating tool selector module configured to select at least one participating tool on at least one relevance parameter; and a multimodality filtration surveillance module installed at a backend analytics server, is configured for a plurality of modality based filtration of the gathered sensory information for anomaly detection in the events.

15. A method for surveillance of distributed geographical sites for a plurality of event, each event associated with at least one predefined characteristics and accessible to a plurality of event subscribers, the method comprises:
coupling flexibly a plurality of sensing devices to a plurality of geographically distributed sites to capture a sensory information from the each site;
processing the captured sensory information to index the each event and generate a cumulative metadata therefor;
compressing and storing the captured sensory information, indexed events and the corresponding metadata thereof in a local storage;
storing the sensory information and metadata of the each indexed event from the plurality of local storages into a central storage;
performing a multimodality filtration surveillance for anomaly detection in the events by a backend analytics server, coupled with a messaging middleware, a central storage and a plurality of participatory surveillance tool;
searching spacio-temporal and geo-spatial characters of the events identifying a distinct temporal occurrence of events and a geographically distributed color graded heat-map of the city sounds; and
wherein the plurality of participatory surveillance tool comprises: a proactive and an event triggered surveillance information input applications installed thereon the sensory devices, social network posts referring to a geo-tagged social network data, video and sound recordings received from mobile devices and text/voice call recordings from the plurality of local sites.

16. The method of claim 15, wherein the backend analytics server is coupled with the messaging middleware, the central storage and the plurality of participatory surveillance tools for distinctively filtering and identifying an event from at least one source thereof, each multimodality filtration offering a greater confidence score of real threat detection resulting in reduced false alarms.

* * * * *